(12) United States Patent
Saito et al.

(10) Patent No.: US 8,142,560 B2
(45) Date of Patent: Mar. 27, 2012

(54) INK SET, AND INK JET RECORDING METHOD USING THE INK SET

(75) Inventors: Chie Saito, Matsumoto (JP); Miharu Kanaya, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 12/383,429

(22) Filed: Mar. 24, 2009

(65) Prior Publication Data

US 2009/0258146 A1   Oct. 15, 2009

(30) Foreign Application Priority Data

Mar. 25, 2008  (JP) ................................. 2008-078571
Feb. 20, 2009  (JP) ................................. 2009-037985

(51) Int. Cl.
*C09D 11/02* (2006.01)

(52) U.S. Cl. .................... 106/31.6; 106/31.86

(58) Field of Classification Search ............... 106/31.6, 106/31.86
See application file for complete search history.

(56) References Cited

U.S. PATENT DOCUMENTS

| | | | | |
|---|---|---|---|---|
| 6,866,707 | B2 * | 3/2005 | Kato | 106/31.6 |
| 2002/0038613 | A1 * | 4/2002 | Yatake | 106/31.6 |
| 2007/0037901 | A1 * | 2/2007 | Kanaya et al. | 523/160 |

FOREIGN PATENT DOCUMENTS

| | | |
|---|---|---|
| JP | 08-003498 | 1/1996 |
| JP | 10-095941 | 4/1998 |
| JP | 10-212426 | 8/1998 |
| JP | 10-237349 | 9/1998 |
| JP | 2000-219832 | 8/2000 |
| JP | 2001-081366 | 3/2001 |
| JP | 2001-207089 | 7/2001 |
| JP | 2002-080761 | 3/2002 |
| JP | 2002-121434 | 4/2002 |
| WO | WO-01/94476 A2 | 12/2001 |

* cited by examiner

*Primary Examiner* — Jerry Lorengo
*Assistant Examiner* — Veronica F Faison
(74) *Attorney, Agent, or Firm* — Nutter McClennen & Fish LLP; John J. Penny, Jr.

(57) ABSTRACT

An ink set including two or more kinds of ink compositions including at least a black ink composition and a color ink composition, in which the black ink composition includes a self-dispersion type pigment having a hydrophilic group on the surface thereof, the color ink composition includes a self-dispersion type pigment having a hydrophilic group on the surface thereof with a phenyl group, and all the ink compositions include resin emulsion, is used in an ink jet recording method. Provision of an ink set for ink jet recording, which is capable of realizing a good image, in addition to high color developability, high ejection stability, high clogging recovering properties, and high fixability.

10 Claims, No Drawings

INK SET, AND INK JET RECORDING METHOD USING THE INK SET

CROSS-REFERENCES TO RELATED APPLICATIONS

The entire disclosure of Japanese Patent Application No. 2008-78571, filed on Mar. 25, 2008, and No. 2009-037985, filed on Feb. 20, 2009, are expressly incorporated by reference herein.

FIELD OF THE INVENTION

The invention relates to, an ink set including two or more kinds of ink compositions including a black ink composition and a color ink composition used in an ink jet recording method or an ink jet recording method of attaching ink compositions onto a recording medium so as to perform printing.

BACKGROUND OF THE INVENTION

An ink jet recording method is a printing method of flying small ink droplets and attaching the ink onto a recording medium such as paper so as to perform printing. As the ink, an ink obtained by dissolving various types of water-soluble pigments in water or water and a water-soluble organic solvent is used. It is generally pointed out that an image formed by the ink including the water-soluble pigment deteriorates in water resistance or light resistance.

In contrast, an ink obtained by dispersing a pigment in an aqueous medium is excellent in water resistance and light resistance. For example, an aqueous pigment ink in which a pigment is dispersed by a surface active agent or a polymer dispersant is suggested. However, in these inks, if the ink content of the coloring agent is increased in order to increase the print density of a recorded matter, the viscosity of the ink may be rapidly increased accordingly. In addition, in order to stably disperse the pigment in the ink, the excessive surface active agent or polymer dispersant is necessary, and print stability may deteriorate due to occurrence of bubbles or deterioration of an anti-foaming property.

In order to solve these problems, a self-dispersion type pigment dispersion which is capable of allowing a pigment to be solely dispersed in an aqueous solvent without a dispersant such as a polymer dispersant, a surface active agent or the like by introducing a predetermined amount or more of surface active hydrogen or a salt thereof on the surface of the pigment is disclosed.

In JP-A-10-237349 (Patent Document 1), JP-A-8-3498 (Patent Document 2), and PCT Patent Publication No. 01/94476 (Patent Document 3), a so-called self-dispersion type pigment which not require the above-described dispersant is characterized in that an optical density (OD) value of an image is increased when it is used in the ink as the coloring agent, handling is facilitated because the viscosity of the ink is apt to be in a proper range, compatibility between the dispersant and various additive solvents does not need to be considered. On the surface of the pigment, a hydrophilic group such as a carbonyl group, a carboxyl group, a hydroxyl group, a sulfonic group, an ammonium group or the like is bonded directly or indirectly via an alkyl group, an aryl group and the like.

In addition, in JP-A-10-95941 (Patent Document 4), JP-A-2001-207089 (Patent Document 5) and JP-A-2000-219832 (Patent Document 6), an ink jet ink including the above-described self-dispersion type carbon black and glycol ethers is suggested.

Meanwhile, an image formed by the ink using the self-dispersion type pigment as the coloring agent generally has low fixability. A recorded matter having sufficient scratch resistance in which the image is stained when the image is scrubbed by a finger, a line marker, paper or the like cannot be obtained. Accordingly, in order to improve the fixability of the self-dispersion type pigment to a recording medium, the addition of resin, which has a binding effect with respect to the recording medium, to an ink composition is suggested.

JP-A-2001-81366 (Patent Document 7) and JP-A-2002-80761 (Patent Document 8) suggest a recording liquid for an ink printer including a recording liquid including a coloring agent, resin fine particles and water, an aqueous dispersion of a pigment, and resin particles as an ink composition including resin particles.

Meanwhile, in JP-A-2002-121434 (Patent Document 9), as an aqueous color ink set for ink jet recording, which includes a black ink and includes at least a cyan ink, a magenta ink and a yellow ink as color inks, the aqueous color ink set for ink jet recording, in which a pigment is capable of being self-dispersed in water is included in the black ink and the color inks is disclosed. In addition, for example, it is described that the self-dispersion pigment can be prepared by treating the cyan pigment by sulfanilic acid or sodium sulfite.

In addition, in JP-A-10-212426 (Patent Document 10), an oxidation-treated carbon black obtained by performing oxidation treatment with respect to a carbon black by an oxidant and a method of manufacturing a dispersion liquid of the carbon black is disclosed. However, the surface treatment of a pigment of a color ink composition is not disclosed.

RELATED ART

[Patent Document 1] JP-A-10-237349
[Patent Document 2] JP-A-8-3498
[Patent Document 3] PCT Patent Publication No. 01/94476
[Patent Document 4] JP-A-10-95941
[Patent Document 5] JP-A-2001-207089
[Patent Document 6] JP-A-2000-219832
[Patent Document 7] JP-A-2001-81366
[Patent Document 8] JP-A-2002-80761
[Patent Document 9] JP-A-2002-121434
[Patent Document 10] JP-A-10-212426

SUMMARY OF THE INVENTION

The present inventors found that a good image can be realized in addition to high color developability, high ejection stability, high clogging recovering properties, and high fixability, by using an ink set including two or more kinds of ink compositions including at least a black ink composition and a color ink composition, wherein the black ink composition includes a self-dispersion type pigment having a hydrophilic group on the surface thereof, the color ink composition includes a self-dispersion type pigment having a hydrophilic group on the surface thereof with a phenyl group, and all the ink compositions include resin emulsion. The invention is based on such a finding.

Accordingly, an object of the invention is to provide an ink set for ink jet recording, which is capable of realizing a good image, in addition to high color developability, high ejection stability, high clogging recovering properties, and high fixability.

In addition, the ink set of the invention is an ink set including two or more kinds of ink compositions including at least a black ink composition and a color ink composition, wherein the black ink composition includes a self-dispersion type pigment having a hydrophilic group on the surface thereof, and the color ink composition includes a self-dispersion type pigment having a hydrophilic group on the surface thereof with a phenyl group, and all the ink compositions include resin emulsion.

In addition, an ink jet recording method according to the invention is an ink jet recording method of ejecting liquid droplets of ink compositions and attaching the liquid droplets onto a recording medium so as to perform printing, wherein the method uses the above-described ink set.

According to the invention, it is possible to provide an ink set which is capable of realizing a good image, in addition to high color developability, high ejection stability, high clogging recovering properties, and high fixability.

DETAILED DESCRIPTION OF THE PRESENT INVENTION

An ink set of the invention is an ink set including two or more kinds of ink compositions including at least a black ink composition and a color ink composition, wherein the black ink composition includes a self-dispersion type pigment having a hydrophilic group on the surface thereof, the color ink composition includes a self-dispersion type pigment having a hydrophilic group on the surface thereof with a phenyl group, and all the ink compositions include resin emulsion. Hereinafter, the black ink composition and the color ink composition configuring the ink set according to the invention will be described.

Black Ink Composition

A pigment of a black ink composition which can be used in the invention is a self-dispersion type pigment.

The self-dispersion type pigment is a pigment which can be dispersed and/or dissolved in an aqueous medium without a dispersant. Here, "dispersion and/or dissolution in the aqueous medium without the dispersant" indicates a state in which, although the dispersant for dispersing the pigment is not used, the pigment is stably present in the aqueous medium by a hydrophilic group on the surface thereof.

An ink containing the self-dispersion type pigment as a coloring agent does not need to contain the above-described dispersant in order to disperse a general pigment. Accordingly, foaming due to deterioration of an anti-foaming property, which is caused by the dispersant, is hardly generated, and an ink which is excellent in ejection stability is apt to be manufactured. In addition, since the significant viscosity increase caused by the dispersant is suppressed, more pigments can be contained, print density can be sufficiently increased, and handling is facilitated.

It is preferable that the black ink composition of the invention is a self-dispersion type pigment having a hydrophilic group on the surface of the pigment, and the hydrophilic group is a hydrophilic group of one or more selected from the group consisting of —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, and —$NR_3$ (M of Formulas denotes a hydrogen atom, alkali metal, ammonium or organic ammonium, R denotes a naphthyl group which may have a substituent group or an alkyl group having 1 to 12 carbon atom(s).

As a pigment which becomes a raw material of the self-dispersion type pigment of the black ink composition, for example, a carbon black manufactured by a known method such as a contact method, a furnace method, a thermal method and the like may be used. The detailed examples of the preferable carbon black according to the invention include No. 2300, 900, MCF88, No. 20B, No. 33, No. 40, No. 45, No. 52, MA7, MA8, MA100, No2200B (manufactured by Mitsubishi Chemical Corporation), color black FW1, FW2, FW2V, FW18, FW200, S150, S160, S170, Pritex 35, U, V, 140 U, special black 6, 5, 4A, 4, 250 (manufactured by Evonik Degussa industries), Condectex SC, RAVEN 1255, 5750, 5250, 5000, 3500, 1255, 700 (manufactured by Columbian Chemical), REGAL 400R, 330R, 660R, MOGUL L, MONARCH 700, 800, 880, 900, 1000, 1100, 1300, 1400, and ELFTEX 12 (manufactured by Cabot Corporation). These carbon blacks may be used as a mixture of one type or two or more kinds.

The self-dispersion type pigment of the black ink composition is obtained by performing, for example, a physical treatment or a chemical treatment with respect to a pigment, and is manufactured by bonding (grafting) the hydrophilic group to the surface of the pigment. The physical treatment may include, for example, a vacuum plasma treatment and the like. In addition, the chemical treatment may include, for example, a wet oxidation method of performing oxidation in water by an oxidation agent and the like.

In the invention, a black self-dispersion type pigment which is subjected to a surface treatment by an oxidation treatment using hypohalous acid and/or hypohalite, an oxidation treatment using ozone, or an oxidation treatment using persulfuric acid and/or persulfate is preferable from the viewpoint of high color developability. In addition, a commercial available product can be used as the self-dispersion type pigment of the black ink composition, and the preferable examples thereof include Microjet CW1 (manufactured by Orient Chemical Industries, Ltd.) and so on.

The amount of self-dispersion type pigment included in the black ink composition is preferably 6 wt % or more. If the amount of self-dispersion type pigment included in the black ink composition is 6 wt % or more, a recorded matter thereof has high color developability.

In addition, the average particle diameter of the self-dispersion type pigment is preferably in a range of 50 to 250 nm, from the viewpoint of the storage stability of the ink, the clogging prevention of a nozzle and the like.

The black ink composition of the invention preferably includes at least 60 to 10 wt % of water, a water-soluble organic solvent, and a surface active agent.

Since the amount of water absorbed to cellulose of coated paper is smaller than that of the conventional ink composition by defining the amount of water included in the ink composition in the above-described range, it is possible to suppress the expansion of cellulose which causes cockling or curl. Accordingly, the ink composition of the present embodiment is available in a recording medium having an absorption layer of a paper supporter with an insufficient ink absorption property, such as plain paper, coated paper for print (printing paper) and the like.

The water contained in the black ink composition of the invention is a main solvent, and pure water or ultrapure water such as ion exchange water, ultrafiltration water, osmotic water, distillated water and the like is preferably used. In particular, water which is sterilized by the irradiation of ultraviolet rays or the addition of hydrogen peroxide is preferably used, because the generation of mold and bacteria is prevented and thus the long-term storage of the ink composition is possible.

In the invention, the water-soluble organic compound includes, for example, polyhydric alcohols such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2, 4-pentanediol, 1,2-octanediol, 1,2-hexanediol, 1,2-pentanediol, 4-methyl-1,2-pentanediol, and the like, a so-called solid humectant such as sugars such as glucose, mannose, fructose, ribose, xylose, arabinose, galactose, aldonic acid, glucitol, (sorbit), maltose, cellobiose, lactose, saccharose, trehalose, maltotriose and the like, sugar alcohols, hyaluronic acids, ureas and the like, alkyl alcohols having a carbon number of 1 to 4, such as ethanol, methanol, butanol, propanol, isopropanol and the like, glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, and the like, 2-pyrolidone, N-methyl-2-pyrolidone, 1,3-dimethyl-2-imidazolidinone, formamide, acetamide, dimethylsulfoxide, sorbit, sorbitan, acetine, diacetin, triacetin, sulfolane, and the like, and one type or two or more kinds of them may be used. The amount of aqueous organic solvent included in the black ink composition is preferably 10 to 90 wt %, from the viewpoint that a proper physicality value (viscosity and the like) of the black ink composition is secured, and printing quality and reliability are secured. By including the aqueous organic solvent in the black ink composition of the invention, storage stability and ejection stability are good in spite of the high solid content.

In the invention, by using a combination of at least the polyhydric alcohols, the glycol butyl ethers, and the pyrolidones as the water-soluble organic solvent, it is possible to provide a black ink composition in which is excellent reliability such as printing quality, ejection stability, clogging recovering properties and the like. This is because the polyhydric alcohols is very suitable for a water holding property (moisture holding property) and the control for the penetration of the black ink composition to recording media such as plain paper and the like, the glycol butyl ethers is very suitable for ejection stability and the control for the penetration of the ink composition to recording media, and the pyrolidones significantly contributes to the ejection stability, and the storage stability and the color developability of the ink composition. Accordingly, by using the combination of the polyhydric alcohols, the glycol butyl ethers, and the pyrolidones, it is possible to provide the black ink composition in which is excellent reliability such as printing quality, ejection stability, clogging recovering properties and the like.

In the present embodiment, polyhydric alcohol monoalkyl ether and/or nitrogen-containing cyclic compound is included by 5 wt % or more as the water-soluble organic solvent and the polyhydric alcohols are preferably included. By using such an aqueous organic solvent, it is possible to suppress cockling or curl and secure printing quality such as blur, stain and the like.

Here, the polyhydric alcohol monoalkyl ether includes, for example, diethylene glycol monoethyl ether, diethylene glycol monobutyl ether, diethylene glycol monoisobutyl ether, dipropylene glycol monomethyl ether, dipropylene glycol monoisopropyl ether, dipropylene glycol monoisopropyl ether, dipropylene glycol monobutyl ether, triethylene glycol monomethyl ether, triethylene glycol monobutyl ether, tripropylene glycol monomethyl ether, tripropylene pricol monobutyl ether, and the like, among the glycol ethers. The nitrogen-containing cyclic compound includes, for example, 1,3-dimethyl-2-imidazolidinone, 2-pyrolidone, N-methyl-2-pyrolidone, ϵ-caprolactam, and the like.

Here, as the polyhydric alcohols, any one of the polyhydric alcohols may be used, and, more particularly, 1,2-alkanediol such as 1,2-pentanediol, 1,2-hexanediol, 1,2-octanediol and the like is preferably included.

The surface active agent contained in the black ink composition of the invention may contain an anionic surface active agent, a cationic surface active agent, an amphoteric surface active agent, and a nonionic surface active agent. More particularly, the nonionic surface active agent is preferable from the viewpoint that the ink composition, in which whipping or foaming is reduced, is obtained.

The detailed examples of the nonionic surface active agent include an acethylene glycol-based surface active agent, an acethylene alcohol-based surface active agent, ether-based surface active agents such as polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, polyoxyalkylene alkyl ether, and the like; ester-based surface active agents such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, polyoxyethylene stearate, and the like; polyether modified-siloxane-based surface active agents such as dimethyl polysiloxane and the like; and fluorine-containing-based surface active agents such as fluorine alkyl esters, perfluoroalkyl carboxylates, and the like. The nonionic surface active agent may use a combination of one type or two or more kinds.

Among the non-ionic surface active ions, in particular, the acethylene glycol-based surface active agent and/or the polyether modified siloxane-based surface active agent are preferable from the viewpoint that foaming is reduced and an anti-foaming property is excellent.

The detailed examples of the acethylene glycol-based surface active agent include 2,4,7,9-tetramethyl-5-decyn-4,7-diol, 3,6-dimethyl-4-octene-3,6-diol, 3,5-dimethyl-1-hexene-3-ol, and the like, but a commercial product can be acquired. For example, Surfynol 104, 82, 465, 485, or TG (manufactured by Air Product and Chemicals, Inc) or Olfin STG, Olfin E1010 and the like (manufactured by Nisshin Kagaku Kogyo K.K.). The detailed examples of the polyether modified siloxane-based surface active agent include BYK-345, BYK-346, BYK-347, BYK-348, uv3530, and the like of BYK Additives & Instruments. Plural kinds of them may be used in the ink composition, the surface tension thereof is preferably adjusted to 20 to 40 mN/m, and they are included in the ink composition by 0.1 to 3.0 wt %.

The black ink composition of the invention preferably contains a pH controlling agent. As the pH controlling agent, alkali hydroxide such as lithium hydroxide, potassium hydroxide, sodium hydroxide, and the like; and/or alkanolamine such as ammonia, triethanolamine, tripropanolamine, diethanolamine, monoethanolamine and the like; and the like may be used. In particular, at least one type of pH controlling agent selected from alkali metal hydroxide, ammonia, triethanolamine, and tripropanolamine is included and the pH is controlled to 6 to 10. If the pH is out of this range, materials constituting an ink jet printer and the like are adversely influenced and clogging recovering properties deteriorate.

In addition, if necessary, colicin, imidazole, phosphoric acid, 3-(N-morpholino) propanesulfonic acid, tris(hydroxymethyl)aminomethane, boric acid and the like may be used as a pH buffering agent.

In addition, if necessary, an anti-foaming agent, an antioxidizing agent, an ultraviolet absorbing agent, an antiseptic agent, a fungicide, and the like may be added to the black ink composition.

As the antioxidizing agent/the ultraviolet absorbing agent, allophanates such as allophanate, methylallophanate and the like; biurets such as biuret, dimethylbiuret, tetramethylbiuret and the like; L-ascorbic acid and a salt or the lie; Tinuvin328, 900, 1130, 384, 292, 123, 144, 622, 770, 292, Irgacor252, 153, Irganox1010, 1076, 1035, MD1024 and the like which is manufactured by Nihon Ciba-Geigy K.K.; lanthanide oxide and the like may be used.

As the antiseptic agent/the fungicide, for example, sodium benzoate, sodium pentachlorophenol, 2-pyridinethiol-1-sodium oxide, sodium sorbate, sodium dehydroacetate, 1,2-dibenzisothiazolin-3-one (Proxel CRL, Proxel BDN, Proxel GXL, Proxel XL-2 and Proxel TN manufactured by AVECIA Co., Ltd.) and the like.

Color Ink Composition

A pigment of a color ink composition which is available in the invention is a self-dispersion type pigment which can be dispersed and/or dissolved in water without a dispersant, similar to the pigment of the black ink composition.

It is preferable that the color ink composition of the invention is a self-dispersion type pigment having a hydrophilic group on the surface of the pigment with a phenyl group, and the hydrophilic group includes one or more hydrophilic groups selected from the group consisting of —OM, COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$ (M of Formulas denotes a hydrogen atom, alkali metal, ammonium or organic ammonium, R denotes a naphthyl group which may have a substituent group or an alkyl group having 1 to 12 carbon atom(s), similar to the black ink composition.

The pigment which is the raw material of the self-dispersion type pigment of the color ink composition may include pigments such as a phthalocyanine pigment, an azo pigment, an anthraquinone pigment, an azomethine pigment, a condensed cyclic pigment and the like, in addition to pigments such as pigment yellow, pigment red, pigment violet, pigment blue, pigment black and the like, which are described in a color index. In addition, organic pigments such as yellow Nos. 4, 5, 205, and 401; orange Nos. 228 and 405; blue Nos. 1 and 404; or inorganic pigments such as titanium oxide, zinc oxide, zirconium oxide, iron oxide, ultramarine blue, iron blue, chrome oxide and so on may be used. In more detail, for example, C.I. pigment yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, 198, C.I. pigment red 1, 3, 5, 8, 9, 16, 17, 19, 22, 38, 57:1, 90, 112, 122, 123, 127, 146, 184, C.I. pigment violet 1, 3, 5:1, 16, 19, 23, 38, and C.I. pigment blue 1, 2, 15, 15:1, 15:2, 15:3, 15:4, 16 may be used. In particular, it is preferable that the organic pigment included in the yellow ink composition includes at least one type selected from the group consisting of C.I. pigment yellow 74, 109, 110, 128, 138, 147, 150, 155, 180, and 188, the organic pigment included in the magenta ink composition includes at least one type selected from the group consisting of C.I. pigment red 122, 202, 207, 209 and C.I. pigment violet 19, and the organic pigment included in the cyan ink composition includes at least one type selected from the group consisting of C.I. pigment blue 15, 15:1, 15:2, 15:3, 15:4, and 16.

Meanwhile, the self-dispersion type pigment of the color ink composition is manufactured by bonding the hydrophilic group to the surface of the pigment with the phenyl group. As a surface treatment unit for bonding the functional group or a salt thereof, which is the hydrophilic group, to the surface of the pigment with the phenyl group, various known surface treatment units may be applied and a method of bonding the hydrophilic group with the phenyl group by bonding sulfanilic acid, p-aminobenzoic acid, 4-aminosalicylic acid or the like on the surface of the pigment may be used.

Commercial available products can be used as the self-dispersion type pigment of the color ink composition and include CAB-O-JET250C, CAB-O-JET260M, CAB-O-JET270Y and the like (manufactured by Cabot Corporation).

The amount of self-dispersion type pigment included in the color ink composition is preferably 6 wt % or more, similar to the black ink composition. If the amount of self-dispersion type pigment included in the black ink composition is 6 wt % or more, a recorded matter thereof has high color developability.

In addition, the average particle diameter of the self-dispersion type pigment of the color ink composition is preferably in a range of 50 to 250 nm, similar to the black ink composition, from the viewpoint of the storage stability of the ink, the clogging prevention of a nozzle and the like.

The color ink composition of the invention preferably includes at least 60 to 10 wt % of water, a water-soluble organic solvent, and a surface active agent, similar to the black ink composition. The detailed examples and the contents thereof may be equal to those of the black ink composition.

In addition, similar to the black ink composition, if necessary, a pH controlling agent, a pH buffering agent, an anti-foaming agent, an antioxidizing agent, an ultraviolet absorbing agent, an antiseptic agent, a fungicide, and the like may be added to the color ink composition of the invention. The detailed examples thereof may be equal to those of the black ink composition.

Resin Emulsion

Resin emulsion has a property for improving fixability of an image portion of a recorded matter, because resin particles or a resin particle and a coloring component are fused to each other during the drying of the ink and the coloring agent is adhered to a recording medium.

As the resin particles, one type or two or more kinds selected from the group consisting of an acrylic resin, a methacrylic resin, a styrene resin, a urethane resin, an acrylic amide resin and an epoxy resin is preferable. These resins may be used as a homopolymer or a copolymer.

In the invention, resin particles having a single-particle structure may be used as the resin particles. Meanwhile, in the invention, the resin particles each having a core/shell structure including a core portion and a shell portion surrounding it may be used. In the invention, the "core/shell structure" indicates that "two or more kinds of polymers having different compositions are phase-separated and present in the particle". Accordingly, the shell portion may not only completely cover the core portion but also may partially cover the core portion. In addition, a portion of the polymer of the shell portion may form a domain or the like in the core particle. In addition, each of the resin particles may have a multi-layer structure having three or more layers including one or more layers having different compositions between the core portion and the shell portion.

The resin particles used in the invention can be obtained by known emulsion polymerization. That is, an unsaturated vinyl monomer can be obtained by emulsion polymerization in water in which a polymerization catalyst and an emulsifying agent are present.

The unsaturated vinyl monomer includes acrylic acid ester monomers, methacrylic acid ester monomers, aromatic vinyl monomers, vinyl ester monomers, vinylcyan compound monomers, halogenated monomers, olefin monomers, diene monomers and the like, which are commonly used in emulsion polymerization.

More specific examples include methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, and other such acrylic esters; methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, and other such methacrylic esters; vinyl acetate and other such vinyl esters; acrylonitrile, methacrylonitrile, and other such vinylcyan compounds; vinylidene chloride, vinyl chloride, and other such halogenated monomers; styrene, α-methylstyrene, vinyltoluene, t-butylstyrene, chlorstyrene, vinylanisol, vinylnaphthalene, and other such aromatic vinyl monomers; ethylene, propylene, and other such olefins; butadiene, chloroprene, and other such dienes; vinyl ether, vinyl ketone, vinylpyrrolidone, and other such vinyl monomers; acrylic acid, methacrylic acid, itaconic acid, fumaric acid, maleic acid, and other such unsaturated carboxylic acids; acrylamide, N,N'-dimethylacrylamide, and other such acrylamides; and 2-hydroxyethyl acrylate, 2-hydroxypropyl acrylate, 2-hydroxyethyl methacrylate, 2-hydroxypropyl methacrylate, and other such hydroxyl group-containing monomers.

In addition, in the invention, those having a crosslinked structure by a crosslinkable monomer having two or more polymerizable double bonds can also be used as the molecules derived from the monomer. Examples of crosslinkable monomers having two or more polymerizable double bonds include polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, and other such diacrylate compounds; trimethylolpropane triacrylate, trimethylolethane triacrylate, tetramethylolmethane triacrylate, and other such triacrylate compounds; ditrimethylol tetraacrylate, tetramethylolmethane tetraacrylate, pentaerythritol tetraacrylate, and other such tetraacrylate compounds; dipentaerythritol hexaacrylate and other such hexaacrylate compounds; ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, and other such dimethacrylate compounds; trimethylolpropane trimethacrylate, trimethylolethane trimethacrylate, and other such trimethacrylate compounds; and methylenebisacrylamide and divinylbenzene. These can be used singly or in mixtures of two or more kinds.

In addition to the polymerization initiator used in the emulsion polymerization, an emulsifying agent and a molecular weight modifier may be used according to standard methods.

As the polymerization initiator, the same polymerization initiator as that used in general radical polymerization is used, and the examples of the polymerization initiator include potassium persulfate, ammonium persulfate, hydrogen peroxide, azobisisobutyronitrile, benzoyl peroxide, dibutyl peroxide, acetyl hydroperoxide, cumene hydroperoxide, t-butyl hydroxyperoxide, paramenthane hydroxyperoxide and the like. In particular, as described above, if polymerization reaction is performed in water, a water-soluble polymerization initiator is preferable.

The emulsifying agent include, for example, that used as an anionic surface active agent, a nonionic surface active agent, or an amphoteric surface active agent, and a mixture thereof, in addition to sodium lauryl sulfate. These can be used singly or in mixtures of two or more kinds.

In the case where the resin particles are manufactured by emulsion polymerization, and, more particularly, in the case where polymer emulsion including the anionic resin particles is manufactured by emulsion polymerization, since a negative-polarity group such as a carboxylic group or a sulfonic group is present on the surface of each of the resin particles, pH is biased to an acid side and viscosity increase or agglomeration is apt to occur. Accordingly, neutralization by a basic material is generally performed. As this basic material, ammonia, organic amines, inorganic hydroxide or the like may be used. From the viewpoint of the long-term storage stability and the ejection stability of the polymer emulsion and the aqueous ink composition, among them, monovalent inorganic hydroxide (potassium hydroxide, sodium hydroxide, lithium hydroxide) is particularly preferable. The additive amount of neutralizer is adequately determined such that the pH of the polymer emulsion is in a range from 7.5 to 9.5 and preferably in a range from 7.5 to 8.5.

From the viewpoint of the long-term storage stability and the ejection stability of the ink composition, the preferred diameter of the resin particles of the invention is in a range from 5 to 400 nm and more preferably in a range from 50 to 200 nm.

In addition, the additive amount of resin emulsion is adequately determined in consideration of fixability or the like, but is preferably included in each ink composition as solid content by 2 wt % or more.

Ink Set

An ink set according to the invention may be constituted similar to the known ink set, and may be used as an ink for known various kinds of recording methods. In particular, in the invention, since an image with high quality and high resolution can be rapidly printed by a relatively cheap apparatus, the ink set is suitable for ink jet recording, that is, printing performed by flying and attaching small ink droplets to a recording medium such as paper.

Ink Jet Recording Method

In an ink jet recording method using the ink set of the invention, liquid droplets of the ink composition are ejected, and the liquid droplets are attached to the heated recording medium, thereby performing printing. The examples of the method of ejecting the liquid droplets of each ink composition includes, for example, a method of converting an electrical signal into a mechanical signal using an electrostrictive element, intermittently ejecting an ink stored in a nozzle head portion, and recording characters or symbols on the surface of a recording medium and a method of rapidly heating an ink stored in a nozzle head portion at a position very close to an ejection portion so as to generate bubbles, intermittently ejecting the ink by volume expansion due to the bubbles, and recording characters or symbols on the surface of a recording medium. According to the preferred aspect of the invention, the ink set according to the invention is preferably used in the ink jet recording method using the electrostrictive element. The ejection of the liquid droplets of each ink composition is preferably performed by a recording head for ejecting ink droplets using a mechanical action of a piezoelectric element.

A recorded matter in which recording is performed on a recording medium using the ink set according to the invention can realize a good image in addition to high color developability, high ejection stability, high clogging recovering properties, and high fixability.

As the recording medium, various materials may be used, and the examples thereof include, for example, paper used exclusively for ink jet (mat paper, glossy paper and the like), plain paper, printing paper, a film, and the like.

EXAMPLES

The invention will be described in more detail by the following examples, but the invention is not limited to these examples.

Self-dispersion Type Pigment Having Hydrophilic Group Bonded thereon with Phenyl Group Manufacture of Cyan Pigment Dispersion Liquid 1

A 4-liter beaker made of stainless steel was attached to a rotor-stator type high-shear mixer (Silverthorn L4RT-A) and was immersed in an ice bath. About 75 g of C.I. pigment blue 15:4 and 1000 g of water were inserted into this beaker and homogenization was performed by 7200 rpm for 15 minutes. 20 ml of isopropanol solution in which 2.07 g (0.01 mol) of o-acetanisidide is dissolved was added to it and agitation was performed for 15 minutes.

In another container, 4.35 g (0.025 mol) of sulfanilic acid, 30 mL of 1N—HCl and 1.73 g (0.025 mol) of sodium nitrite was mixed at 5 to 10° C. so as to form diazonium salt. Subsequently, this was added to a mixture of the C.I pigment blue 15:4 and o-acetanisidide while being agitated and the temperature was held at about 10° C. This mixture was adjusted to pH 5 to 6 by the addition of the droplets of a 5M sodium hydroxide, and was agitated for 2 hours while checking the progress of the reaction by the existence/non-existence of the diazonium salt. If the diazonium salt is present, when a reaction mixture and a 1M-$Na_2CO_3$ solution in which 0.1% aminosalicylic acid is dissolved are dropped on filter paper one by one and the spreads of these two droplets are brought into contact with each other, an orange color is obtained.

The mixture was transferred to a Telsonic flow through sonicator and was sonicated for 2 hours, and the obtained pigment dispersion liquid was purified using 50 nm diafiltration membrane column and was condensed to a solid content ratio of 20%, thereby obtaining the cyan pigment dispersion liquid 1.

Manufacture of Magenta Pigment Dispersion Liquid 1

Except that C.I. pigment red 122 is used as the pigment instead of the C.I. pigment blue 15:4, the magenta pigment dispersion liquid 1 having a solid content concentration of 20 wt % was obtained by the manufacturing method similar to the cyan pigment dispersion liquid 1.

Manufacture of Yellow Pigment Dispersion Liquid 1

Except that C.I. pigment yellow 74 is used as the pigment instead of the C.I. pigment blue 15:4, the yellow pigment dispersion liquid 1 having a solid content concentration of 20 wt % was obtained by the manufacturing method similar to the cyan pigment dispersion liquid 1.

Manufacture of Black Pigment Dispersion Liquid 1

Except that C.I. pigment black 7 (carbon black) is used as the pigment instead of the C.I. pigment blue 15:4, the black pigment dispersion liquid 1 having a solid content concentration of 20 wt % was obtained by the manufacturing method similar to the cyan pigment dispersion liquid 1.

Self-Dispersion Type Pigment Having Hydrophilic Group Bonded Thereon by Oxidation Using Ozone Manufacture of Black Pigment Dispersion Liquid 2

20 g of commercially available carbon black S170 (manufactured by Evonik Degussa industries) was mixed to 500 g of water and was dispersed by a household mixer for five minutes. The obtained liquid was inserted into a 3-liter glass container having an agitator, and 8 wt % of ozone-containing gas was introduced by 500 mL/min while the liquid agitated by the agitator. At this time, an ozone generator generated ozone using an electrolysis generation type ozonizer of PERMELEC ELECTRODE CO., LTD. The obtained dispersion liquid was filtered by glass fiber filter paper GA-100 (manufactured by Advantec Toyo Kaisha, Ltd.), and a 0.1 N potassium hydroxide solution was additionally added until the pigment concentration becomes 20 wt %, and condensation was performed while pH is adjusted to 9, thereby manufacturing a black pigment dispersion liquid 2.

Manufacture of Cyan Pigment Dispersion Liquid 2

Except that C.I. pigment blue 15:4 is used as the pigment instead of S170, the same manufacturing method as the black pigment dispersion liquid 2 was performed, thereby obtaining a cyan pigment dispersion liquid 2 having a solid content concentration of 20 wt %.

Manufacture of Magenta Pigment Dispersion Liquid 2

Except that C.I. pigment red 122 is used as the pigment instead of S170, the same manufacturing method as the black pigment dispersion liquid 2 was performed, thereby obtaining a magenta pigment dispersion liquid 2 having a solid content concentration of 20 wt %.

Manufacture of Yellow Pigment Dispersion Liquid 2

Except that C.I. pigment yellow 74 is used as the pigment instead of S170, the same manufacturing method as the black pigment dispersion liquid 2 was performed, thereby obtaining a yellow pigment dispersion liquid 2 having a solid content concentration of 20 wt %.

Self-Dispersion Type Pigment Having Hydrophilic Group Bonded thereon by Oxidation Using Hypohalite Salt Manufacture of Black Pigment Dispersion Liquid 3

100 g of carbon black S170 (manufactured by Evonik Degussa industries) was mixed to 1 kg of water and was pulverized by a ball mill using zirconia beads. 1400 g of sodium hypochlorite (effective chlorine concentration 12%) was dripped to the pulverized liquid, reaction was performed for five hours while the pulverization is performed by the ball mill, boiling was performed for four hours while, agitation is additionally performed, and wet oxidation was performed. The obtained dispersion liquid was filtered by glass fiber filter paper GA-100 (manufactured by Advantec Toyo Kaisha, Ltd.) and was additionally cleaned by water. The obtained wet cake was redispersed in 5 kg of water, desalination and purification were performed until conductivity becomes 2 mS/cm by a reverse osmosis membrane, and condensation was additionally performed while the pigment concentration becomes 20 wt %, thereby manufacturing a black pigment dispersion liquid 3.

Self-dispersion Type Pigment Having Hydrophilic Group Bonded Thereon by Oxidation Using Persulfate Manufacture of Black Pigment Dispersion Liquid 4

150 g of carbon black S170 (manufactured by Evonik Degussa industries) was added to 3 L of a 2N aqueous sodium persulfate solution and was agitated and mixed for ten hours at a temperature of 60° C. and an agitation speed of 1 $s^{-1}$ so as to perform oxidation. The oxidized carbon black was subjected to a residual salt separating process by an ultrafiltration membrane (manufactured by Asahi Kasei Corporation, AHP-1010). Thereafter, an aqueous sodium hydroxide solution was added so as to adjust pH to 8. In addition, in order to perform condensation by the removal and purification of the remaining salts and the elimination of moisture, the process using ultrafiltration membrane was performed again. A black pigment dispersion liquid 4 was manufactured such that the carbon black concentration of the aqueous solution after the process becomes 20 wt %.

Manufacture of Resin Emulsion 900 g of ion exchange water and 1 g of sodium lauryl sulfate were inserted into a reaction container having an agitator, a recirculated condenser, a dripping device and a thermometer, and a temperature was increased to 70° C. while being replaced with nitrogen under agitation. The internal temperature was maintained at 70° C., 4 g of potassium persulfate was added as a polymerization initiator, and, after dissolution, an emulsified material manufactured by adding 20 g of acrylamide, 365 g of styrene, 545 g of butyl acrylate, and 30 g of methacrylic acid to 450 g of ion exchange water and 3 g of sodium lauryl sulfate in advance under agitation was continuously dripped in the reaction container for four hours. Aging was performed for three hours after the dripping is finished. After the obtained resin emulsion is cooled to a room temperature, ion exchange water and an aqueous sodium hydroxide solution was added so as to adjust the solid content to 40 wt % and pH to 8. The glass transition temperature of the resin particles in the obtained aqueous emulsion was −6° C.

Manufacture of Ink Compositions

Components were mixed according to the composition of Table 1 using the obtained resin emulsion and pigment dispersion liquid and were filtered by a 10 μm membrane filter, thereby manufacturing the ink compositions. In addition, the value of Table 1 denotes the contents (wt %) of the ink. Ink sets 1 to 3 were configured using the obtained ink compositions by a combination shown in Table 2.

TABLE 1

|  | Cyan ink composition | | | Magenta ink composition | | | Yellow ink composition | |
| --- | --- | --- | --- | --- | --- | --- | --- | --- |
|  | C1 | C2 | C3 | M1 | M2 | M3 | Y1 | Y2 |
| Cyan pigment dispersion liquid 1 | 50 | 50 | — | — | — | — | — | — |
| Cyan pigment dispersion liquid 2 | — | — | 50 | — | — | — | — | — |
| Magenta pigment dispersion liquid 1 | — | — | — | 50 | 50 | — | — | — |
| Magenta pigment dispersion liquid 2 | — | — | — | — | — | 50 | — | — |
| Yellow pigment dispersion liquid 1 | — | — | — | — | — | — | 50 | 50 |
| Yellow pigment dispersion liquid 2 | — | — | — | — | — | — | — | — |
| Black pigment dispersion liquid 1 | — | — | — | — | — | — | — | — |
| Black pigment dispersion liquid 2 | — | — | — | — | — | — | — | — |
| Black pigment dispersion liquid 3 | — | — | — | — | — | — | — | — |
| Black pigment dispersion liquid 4 | — | — | — | — | — | — | — | — |
| Resin emulsion 1 | 3 | — | 3 | 3 | — | 3 | 3 | — |
| Glycerine | 8 | 8 | 8 | 8 | 8 | 8 | 8 | 8 |
| Triethylene glycol | 5 | 5 | 5 | 5 | 5 | 5 | 5 | 5 |

TABLE 1-continued

| | | | | | | | | |
|---|---|---|---|---|---|---|---|---|
| 1,2-hexanediol | 5 | 5 | 5 | 5 | 5 | 5 | 5 | 5 |
| Trimethylol propane | 3 | 3 | 3 | 3 | 3 | 3 | 3 | 3 |
| Triethylene glycol monobutyl ether | 10 | 15 | 10 | 10 | 15 | 10 | 10 | 15 |
| Olfin E1010 | 0.5 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 | 0.5 |
| Triethanolamine | 1 | 1 | 1 | 1 | 1 | 1 | 1 | 1 |
| Water | Residual amount | Residual amount | Residual amount | Residual amount | Residual amount | Residual amount | Residual amount | Residual amount |
| Pigment included in ink composition | 10 | 10 | 10 | 10 | 10 | 10 | 10 | 10 |
| Water included in ink composition | 54 | 52 | 54 | 54 | 52 | 54 | 54 | 52 |

| | Yellow ink composition | Black ink composition | | | | | |
|---|---|---|---|---|---|---|---|
| | Y3 | K1 | K2 | K3 | K4 | K5 | K6 |
| Cyan pigment dispersion liquid 1 | — | — | — | — | — | — | — |
| Cyan pigment dispersion liquid 2 | — | — | — | — | — | — | — |
| Magenta pigment dispersion liquid 1 | — | — | — | — | — | — | — |
| Magenta pigment dispersion liquid 2 | — | — | — | — | — | — | — |
| Yellow pigment dispersion liquid 1 | — | — | — | — | — | — | — |
| Yellow pigment dispersion liquid 2 | 50 | — | — | — | — | — | — |
| Black pigment dispersion liquid 1 | — | 35 | — | — | — | — | — |
| Black pigment dispersion liquid 2 | — | — | 35 | 35 | — | — | 15 |
| Black pigment dispersion liquid 3 | — | — | — | — | 35 | — | — |
| Black pigment dispersion liquid 4 | — | — | — | — | — | 35 | — |
| Resin emulsion 1 | 3 | 3 | 3 | — | 3 | 3 | 2 |
| Glycerine | 8 | 8 | 8 | 8 | 8 | 8 | 8 |
| Triethylene glycol | 5 | 5 | 5 | 5 | 5 | 5 | 5 |
| 1,2-hexanediol | 5 | 5 | 5 | 5 | 5 | 5 | 5 |
| Trimethylol propane | 3 | 3 | 3 | 3 | 3 | 3 | 3 |
| Triethylene glycol monobutyl ether | 10 | 15 | 15 | 18 | 10 | 12 | 20 |
| Olfin E1010 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 |

TABLE 1-continued

| | | | | | | | |
|---|---|---|---|---|---|---|---|
| Triethanolamine | 1 | 1 | 1 | 1 | 1 | 1 | 1 |
| Water | Residual amount | Residual amount | Residual amount | Residual amount | Residual amount | Residual amount | Residual amount |
| Pigment included in ink composition | 10 | 7 | 7 | 7 | 7 | 7 | 3 |
| Water included in ink composition | 54 | 52 | 52 | 52 | 57 | 55 | 52 |

TABLE 2

| | Ink set | Cyan ink composition | Magenta ink composition | Yellow ink composition | Black ink composition |
|---|---|---|---|---|---|
| Example 1 | Ink set 1 | C1 | M1 | Y1 | K2 |
| Example 2 | Ink set 2 | C1 | M1 | Y1 | K4 |
| Example 3 | Ink set 3 | C1 | M1 | Y1 | K5 |
| Example 4 | Ink set 4 | C1 | M1 | Y1 | K6 |
| Example 5 | Ink set 5 | C1 | M1 | Y1 | K1 |
| Comparative example 1 | Ink set 6 | C2 | M2 | Y2 | K3 |
| Comparative example 2 | Ink set 7 | C3 | M3 | Y3 | K1 |

Evaluation Method

Evaluation 1: Measurement of OD Value

The manufactured ink sets are charged in an ink jet printer PX-A550 (manufactured by Seiko Epson Corporation), and printing of 100% Duty patch pattern including cyan, magenta, yellow, black, red, green and blue portions was performed. The printing was performed using Xerox4200 and XeroxP as a recording medium and the obtained sample is left for one hour under a general environment. After being left, the OD values of the patch portions were measured using a Gretag concentration meter (manufactured by manufactured by Gretag Macbeth Co., Ltd.) and the average OD value thereof was determined based on the following reference. The result is shown in Table 3.

A: The OD value is 1.3 or more.
B: The OD value is 1.2 or more to less than 1.3.
C: The OD value is less than 1.2.

Evaluation 2: Color Reproducibility

With respect to the manufactured ink sets, a dedicated output pattern including 400 patches was printed using the same ink jet printer as that described above. Colorimetry of all the patches of the printed matter was performed, and the volume thereof in a 3D space of L*a*b* was calculated by a calculation tool. The calculated GumatVolume is nondimensional. The evaluation of the color reproducibility was determined by the value of the calculated GumatVolume based on the following reference. The result is shown in Table 3.

A: 240000 or more
B: 200000 or more and less than 240000
C: 200000

Evaluation 3: Ejection Stability

The manufactured ink sets were charged in the ink jet printer PX-A550 as described above, and a pattern including solid and ruled lines was continuously printed under an environment of 40° C. If printing disturbance due to nozzle omission or ink flying curve during printing occurs, an auxiliary returning operation (cleaning) was performed in the recording apparatus on each occasion. The number of times of the cleaning necessary for continuous 100 pages was measured and the result was determined based on the following reference. The result is shown in Table 3.

A: The case where the cleaning is not necessary.
B: The case where the cleaning of less than three times is necessary.
C: The case where the cleaning of three times or more is necessary.

Evaluation 4: Clogging Recovering Property

With respect to the manufactured ink set, as described above, after it is checked whether the ink compositions are ejected from all the nozzles, in a state in which an ink cartridge is not present and at a position other than a home position (a state in which the head is deviated from the position of a cap included in the printer and the head is not covered by the cap), the printer was left for one week under the environment of 40° C. After being left, the ink compositions were ejected from all the nozzles again, the number of times of cleaning necessary for the same printing as the initial printing was measured, and the result was determined based on the following reference. The result is shown in Table 3.

A: The case where the same printing as the initial printing is obtained by cleaning of three times or less.
B: The case where the same printing as the initial printing is obtained by cleaning of four times or more and 9 times or less.
C: The case where the same printing as the initial printing is not obtained even by cleaning of ten times or more.

Evaluation 5: Fixability

The manufactured ink sets were charged in the ink jet printer PX-A550, and a pattern including a solid and characters was printed. After the obtained printed matter is naturally dried for 24 hours, the printed characters were rubbed with a writing pressure of 300 g/15 mm$^2$ using a yellow aqueous highlight pen ZEBRA PEN2 (trademark) (manufactured by Zebra Co., Ltd.), and stain attached to the tip of the pen was observed. The result was determined based on the following reference. The result is shown in Table 3.

Determination A: The stain does not occur even when the same portion is rubbed two times.
Determination B: The stain does not occur when the same portion is rubbed one time, but occurs when the same portion is rubbed two times.
Determination C: The stain occurs by rubbing of one time.

TABLE 3

| | OD value | Color reproducibility | Ejection stability | Clogging recovering property | Fixability |
|---|---|---|---|---|---|
| Example 1 | A | A | A | A | A |
| Example 2 | A | A | A | A | A |
| Example 3 | A | A | A | A | A |
| Example 4 | B | B | A | A | A |
| Example 5 | C | B | B | B | A |
| Comparative example 1 | A | A | A | A | C |
| Comparative example 2 | C | C | C | C | A |

What is claimed is:

1. An ink set including two or more kinds of ink compositions including at least a black ink composition and a color ink composition, wherein: the black ink composition includes a self-dispersion type pigment having a hydrophilic group on the surface thereof, a water-soluble organic solvent a surfactant and at least 10 to 60 wt % of water; the color ink composition includes a self-dispersion type pigment having a hydrophilic group on the surface thereof with a phenyl group, a water-soluble organic solvent, a surfactant and at least 10 to 60 wt % of water; and all the ink compositions include a resin emulsion.

2. The ink set according to claim 1, wherein the self-dispersion type pigment is included in each of the ink compositions by 6 wt % or more.

3. The ink set according to claim 1 or 2, wherein the resin emulsion is included in each of the ink compositions by 2 wt % or more.

4. The ink set according to claim 1, wherein the hydrophilic group on the surface of a black pigment is bonded by performing an oxidation treatment with respect to a pigment.

5. The ink set according to claim 4, wherein the oxidation treatment is an oxidation treatment using hypohalous acid and/or hypohalite, an oxidation treatment using ozone, or an oxidation treatment using persulfuric acid and/or persulfate.

6. The ink set according to claim 1, wherein the hydrophilic group includes one or more functional groups selected from the group consisting of —OM, —COOM, —CO—, —SO$_3$M, —SO$_2$M, —SO$_2$NH$_2$, —RSO$_2$M, —PO$_3$HM, —PO$_3$M$_2$, SO$_2$NHCOR, —NH$_3$, and —NR$_3$ (M of Formulas denotes a hydrogen atom, alkali metal, ammonium or organic ammonium, R denotes a naphthyl group which may have a substituent group or an alkyl group having 1 to 12 carbon atom(s)).

7. The ink set according to claim 1, wherein all the ink compositions include at least a water-soluble organic solvent, and a surface active agent.

8. The ink set according to claim 7, wherein the ink composition includes polyhydric alcohol monoalkyl ether and/or nitrogen-containing cyclic compound is included by 5 wt % or more as the water-soluble organic solvent, and includes the polyhydric alcohols.

9. The ink set according to claim 7, wherein the surface active agent is an acethylene-glycol-based surface active agent and/or a polyether modified siloxane-based surface active agent.

10. An ink jet recording method of ejecting liquid droplets of an ink composition and attaching the liquid droplets onto a recording medium so as to perform printing, wherein the method uses the ink set according to claim 1.

* * * * *

UNITED STATES PATENT AND TRADEMARK OFFICE
CERTIFICATE OF CORRECTION

PATENT NO.         : 8,142,560 B2
APPLICATION NO.    : 12/383429
DATED              : March 27, 2012
INVENTOR(S)        : Chie Saito and Miharu Kanaya It is certified that error appears in the above-identified patent and that said Letters Patent is hereby corrected as shown below:

Title Page (*) Notice: Add -- This patent is subject to a terminal disclaimer. --

Signed and Sealed this
Sixth Day of November, 2012

David J. Kappos
*Director of the United States Patent and Trademark Office*